(12) United States Patent
Keuper

(10) Patent No.: US 7,267,469 B2
(45) Date of Patent: Sep. 11, 2007

(54) COMPACT LIGHTING SYSTEM AND DISPLAY DEVICE

(75) Inventor: Matthijs Hendrik Keuper, San Jose, CA (US)

(73) Assignee: Philips Lumileds Lighting Company, LLC, San Jose, CA (US)

( * ) Notice: Subject to any disclaimer, the term of this patent is extended or adjusted under 35 U.S.C. 154(b) by 188 days.

(21) Appl. No.: 10/505,247

(22) PCT Filed: Feb. 14, 2003

(86) PCT No.: PCT/IB03/00582

§ 371 (c)(1),
(2), (4) Date: Mar. 3, 2005

(87) PCT Pub. No.: WO03/071321

PCT Pub. Date: Aug. 28, 2003

(65) Prior Publication Data

US 2005/0146894 A1    Jul. 7, 2005

(30) Foreign Application Priority Data

Feb. 22, 2002   (EP) .................................. 02075717

(51) Int. Cl.
*F21V 7/04* (2006.01)

(52) U.S. Cl. ........................ 362/600; 362/612; 385/34; 385/131; 385/901

(58) Field of Classification Search ................ 362/551, 362/553, 555, 559, 562, 600, 601, 612; 385/14, 385/31, 33, 34, 36, 129, 130, 131, 132, 900, 385/901
See application file for complete search history.

(56) References Cited

U.S. PATENT DOCUMENTS

| | | |
|---|---|---|
| 4,883,333 A | 11/1989 | Yanez |
| 5,555,161 A * | 9/1996 | Roe et al. .................. 362/555 |
| 5,590,945 A | 1/1997 | Simms |
| 5,921,652 A | 7/1999 | Parker et al. |

FOREIGN PATENT DOCUMENTS

EP     0 962 694 A1     12/1999

OTHER PUBLICATIONS

International Search Report, 3 pages.

* cited by examiner

*Primary Examiner*—John Anthony Ward

(57) ABSTRACT

A compact backlight system for illuminating a display device has a front wall and a rear wall situated opposite thereto. At least one light source comprising a light-emitting diode is provided with a translucent lens-shaped cover. The system has at least one light input structure for coupling light from the light source into the light-emitting panel. During operation, light originating from the light source is incident on the light input structure and distributes itself in the light-emitting panel. According to the invention the light input structure is conically or frustoconically shaped towards the light source. The thickness $d_p$ of the light-emitting panel is smaller than the diameter $d_c$ of the translucent lens-shaped cover of the light source. Preferably, the light input structure is of prismatic or pyramidal shape.

11 Claims, 1 Drawing Sheet

COMPACT LIGHTING SYSTEM AND DISPLAY DEVICE

BACKGROUND

1. Field of Invention

The invention relates to a lighting system provided with a light-emitting panel.

The invention also relates to a display device provided with said lighting system.

2. Description of Related Art

Edge lighting systems are used inter alia as backlighting systems in (picture) display devices, for example for TV sets and monitors. Such lighting systems are particularly suitable for use as backlights for non-emissive displays such as liquid crystal display devices, also referred to as LCD panels, which are used in (portable) computers or (cordless) telephones.

Said display devices usually comprise a substrate provided with a regular pattern of pixels which are each controlled by at least one electrode. The display device utilizes a control circuit for achieving a picture or a data-graphical display in a relevant field of a (picture) screen of the (picture) display device. The light originating from the backlight in an LCD device is modulated by means of a switch or modulator, various types of liquid crystal effects being used. In addition, the display may be based on electrophoretic or electromechanical effects.

Such lighting systems are also used as luminaires for general lighting purposes or for shop lighting, for example shop window lighting or lighting of (transparent or semi-transparent) plates of glass or of (transparent) plates of synthetic resin on which items, for example jewelry, are displayed. Such lighting systems are further used as window panes, for example for causing a glass wall to radiate light under certain conditions, or to reduce or block out the view through the window by means of light. A further alternative application is the use of such lighting systems for illuminating advertising boards.

In the lighting systems mentioned in the opening paragraph, the light source used usually comprises a plurality of optoelectronic elements, also referred to as electro-optical elements, for example electroluminescent elements, such as light-emitting diodes (LEDs). These light sources are usually provided in the vicinity of or tangent to a light-transmitting edge surface of the light-emitting panel, in which case light originating from the light source is incident on the light-transmitting edge surface during operation and distributes itself in the panel.

A lighting system for illuminating an LCD panel is known from U.S. Pat. No. 5,921,652. The light source used is formed by light-emitting diodes (LEDs) which couple light into a light-emitting panel, also referred to as light pipe, via a so-called light transition area. The light is mixed in said light transition area.

A lighting system of the above type occupies too much space.

SUMMARY

It is an object of the invention to wholly or partly eliminate the above disadvantage. According to embodiments of the invention, a lighting system includes a light emitting panel including a front wall, a rear wall situated opposite thereto, at least one light source comprising a light-emitting diode provided with a translucent lens-shaped cover, at least one light input structure for coupling light from the light source into the light-emitting panel, wherein, during operation, light originating from the light source is incident on the light input structure and distributes itself in the light-emitting panel.

In some embodiments the light input structure is conically or frustoconically shaped towards the light source, and the thickness $d_p$ of the light-emitting panel is smaller than the diameter $d_c$ of the translucent lens-shaped cover of the light source.

By increasing the area of the light input structure, the efficiency with which light originating from the light source is coupled into the light-emitting panel may be increased. A light source based on a light-emitting diode normally comprises a light-emitting part (a chip) covered by a translucent lens-shaped cover. The dimensions of this lens-shaped cover as well as the shape of the light input structure largely determine how (efficiently) light is transferred from the light source to the light-emitting panel.

In the known lighting system, the light input structure is an edge surface, generally a side wall of the light-emitting panel. Said edge surface is provided between the front wall and the rear wall of the light-emitting panel. In order to sufficiently efficiently couple light originating from the light source into the light-emitting panel of the known lighting panel with edge surfaces, the thickness of the light-emitting panel has to be larger than the characteristic dimension of the translucent lens-shaped cover, for example the diameter $d_c$ of the translucent lens-shaped cover.

The tapered shape of the light input structure which gradually narrows in the direction of the light source according to the invention enables the light from the light source to be coupled into the light-emitting panel with a relatively high efficiency. Without being obliged to give any theoretical explanation, there exists an inverse relationship between the thickness of the light-emitting panel and the efficiency with which light from the light source is coupled into the light-emitting panel. Due to the relatively large effective surface of the light input structure, the dimensions of the light-emitting panel can be reduced without the relatively high efficiency with which the light is coupled into the light-emitting panel being adversely affected. A compact lighting system is obtained through the measure according to the invention.

Preferably, the light input structure is of prismatic or pyramidal shape. Light input structures in the form of a prism or a pyramid are particularly useful in attaining a large specific surface of the light input structure. The apex (or the frustoconical end) of the pyramid is preferably directed towards the (geometrical) center of the translucent lens-shaped cover and is preferably (approximately) in contact with the translucent lens-shaped cover.

In a preferred embodiment of the lighting system according to the invention the light input structure is an integral part of the light-emitting panel. Preferably, the light-emitting panel and the light input structure of the lighting system are molded in one piece.

A preferred embodiment of the lighting system according to the invention is characterized in that light-guidance means are provided in the vicinity of the light source and the light-emitting panel so as to encompass the light input structure, said light-guidance means guiding the light originating from the light source towards the light input structure.

Preferably, the (inner) surface of the light-guidance means facing the light input structure is reflective or provided with a reflective material. The light-guidance means function as a (specular) mirror guiding the light originating from the light source towards the light input structure.

Preferably, the light-guidance means are elliptically shaped. Elliptically shaped mirrors efficiently guide the light originating from the light source towards the light input structure. In an alternative embodiment the light-guidance means (9) are faceted. Faceting renders it possible to direct the light in specific directions during reflection.

The light source used may be formed by one or more light-emitting diodes (LEDs) and/or by LEDs of different colors which are combined with one another. Colors may be mixed in a desired manner through a suitable use of LEDs, for example for generating white light of a desired color temperature. Preferably, the light source comprises three light-emitting diodes. The LEDs preferably comprise combinations of red, green, and blue LEDs known per se, or, for example, combinations of red, green, blue, and amber LEDs. LEDs with three light emission wavelengths may also be realized by means of two LEDs with different light emission wavelengths, wherein the LEDs of one of the types are (partly) provided with a phosphor, such that the light emission of the LED is converted by the phosphor into light of a third, desired light emission wavelength. A combination, known per se, of the red, green, and blue LEDs renders it possible to realize color changes independently of the status of the display device. The use of LEDs has the further advantage that dynamic lighting possibilities are obtained. For this purpose, a sensor present at one of the edge surfaces measures the optical properties of the light emitted by the light source during operation.

The quantity of light emitted by the LEDs is adjusted in that the luminous fluxes of the light-emitting diodes are varied. This control of the luminous flux usually takes place in an energy-efficient manner. Thus the LEDs can be dimmed without an appreciable loss of efficacy. Preferably, the intensity of the light emitted by the light-emitting diodes is variable in response to the illumination level of a picture to be displayed by the display device or in response to the level of the ambient light. Preferably, the color point of a picture displayed by the display device is determined by the lighting system. An (improved) dynamic range (for example contrast) of the picture to be displayed by the display device is achieved thereby.

Preferably, each of the light-emitting diodes has a luminous flux of at least 10 lm. LEDs with such a high output are also referred to as LED power packages. The use of these high-efficiency, high-output LEDs has the specific advantage that the number of LEDs required for a desired, comparatively high light output can be comparatively small. This benefits the compact construction and the efficiency of the lighting system to be manufactured. Further advantages of the use of LEDs are a comparatively very long service life, the comparatively low energy consumption, and the low maintenance costs for a lighting system with LEDs.

BRIEF DESCRIPTION OF THE DRAWINGS

The invention will now be explained in more detail with reference to a number of embodiments and a drawing, in which.

The Figures are purely diagrammatic and not drawn true to scale. Some dimensions are particularly strongly exaggerated for reasons of clarity. Equivalent components have been given the same reference numerals in the Figures whenever possible.

DETAILED DESCRIPTION

Figure 1:
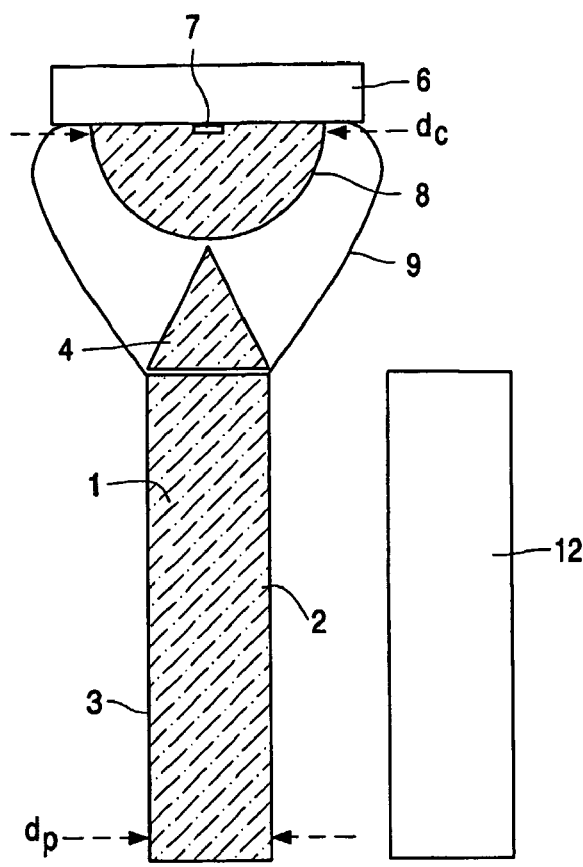
FIG. 1 is a cross-sectional view of a display device comprising an embodiment of the lighting system according to the invention.

FIG. 1 is a cross-sectional view of a display device comprising an embodiment of the lighting system according to the invention. The lighting system comprises a light-emitting panel 1 of a light-transmitting material. The panel 1 is manufactured, for example, from a synthetic resin, from acryl, from polycarbonate, from pmma, for example Perspex, or from glass. Light is transported through the light-emitting panel 1 during operation, utilizing total internal reflection (TIR). The light-emitting panel has a front wall 2 and a rear wall 3 opposite thereto. In FIG. 1 at least one light source 6 is provided comprising a light-emitting diode 7 with a translucent lens-shaped cover 8. The lighting system comprises at least one light input structure 4 for coupling light from the light source 6 into the light-emitting panel 1. During operation, light originating from the light source 6 is incident on the light input structure 4 and distributes itself in the light-emitting panel 1. According to the invention, the light input structure 4 is conically or frustoconically shaped towards the light source 6.

By increasing the area of the light input structure 4, the efficiency with which light originating from the light source 6 is coupled into the light-emitting panel 1 is increased. The light input structure 4 gradually narrows in the direction of the light source, enabling light from the light source 6 to be coupled into the light-emitting panel 1 with a relatively high efficiency. Due to the relatively large effective surface of the light input structure 4, the dimensions of the light-emitting panel 1 are reduced. According to the invention, the thickness $d_p$ of the light-emitting panel 1 is smaller than the diameter $d_c$ of the translucent lens-shaped cover 8 of the light source 6 (see FIG. 1). A compact lighting system is obtained through the measure according to the invention.

In FIG. 1 the light input structure 4 is separate from the light-emitting panel 1. In an alternative embodiment of the lighting system, the light input structure is integral with the light-emitting panel.

The light-emitting panel 1 emits light in the direction of the display device during operation, for example a liquid crystal display (LCD) device 12. The assembly of the light source 6, the light-emitting panel 1, and the LCD device 12, whether or not accommodated in a housing (not shown in FIG. 1), forms a display device for displaying, for example, (video) images.

The light-emitting panel 1 may further be provided with a sensor (not shown in FIG. 1) for measuring the optical properties of the light. This sensor is coupled to control electronics (not shown in FIG. 1) for suitably adapting the luminous flux of the light source 6. A feedback mechanism can be realized by means of the sensor and the control electronics for influencing the quality and quantity of the light coupled out of the light-emitting panel 1.

Figure 2:
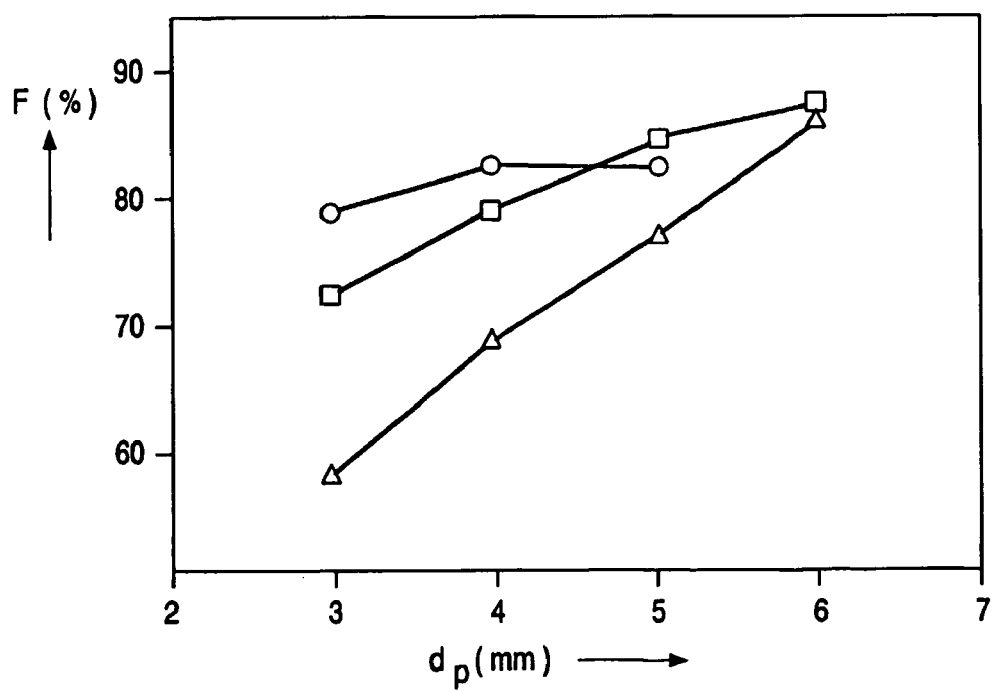
FIG. 2 shows the light input efficiency of various light input structures and various types of light-guidance means as a function of the thickness of the light-emitting panel.

FIG. 2 shows the light input efficiency of various light input structures and various types of light-guidance means as a function of the thickness $d_p$ of the light-emitting panel. The efficiency is indicated by measuring the flux F of the light in the light-emitting panel 1 relative to (in FIG. 2 as a percentage) the light emitted by the light source 6. The diameter $d_c$ of the translucent lens-shaped cover 8 of the LED light source for the measurements in FIG. 2 is 5.5 mm. The triangles in FIG. 2 correspond to measurements carried out on a light-emitting panel wherein the light input structure is a flat edge surface and the light-guidance means have flat surfaces. It can be seen from FIG. 2 (triangles) that the thickness $d_p$ of the light-emitting panel has to be relatively large, typically equal to or larger than the diameter $d_c$ of the translucent lens-shaped cover of the LED light source, to obtain a flux efficiency higher than 80%. The squares in FIG. 2 correspond to measurements carried out on a light-emitting panel wherein the light input structure is a flat edge surface and the light-guidance means have elliptical surfaces. It can be seen from FIG. 2 (squares) that the situation has improved due to the elliptically-curved surfaces of the light-guidance means. In this situation the thickness $d_p$ of the light-emitting panel has to be relatively large to obtain a flux efficiency higher than 80%. The circles in FIG. 2 correspond to measurements for a lighting system according to an embodiment of the invention, employing a light-emitting panel 1 wherein the light input structure 4 has a prismatic shape pointing towards the translucent lens-shaped cover 8 and the light-guidance means 9 have elliptical surfaces (see FIG. 1). It can be seen from FIG. 2 (circles) that a relatively high flux efficiency (approximately 80%) is obtained for a thickness $d_p$ of the light-emitting panel which is approximately half the diameter $d_c$ of the translucent lens-shaped cover of the LED light source. A compact lighting system is obtained through the measure according to the invention.

It will be obvious that many modifications are possible to those skilled in the art within the scope of the invention.

The scope of protection of the invention is not limited to the embodiments given. The invention resides in each novel characteristic and each combination of characteristics. Reference numerals in the claims do not limit the scope of protection thereof. The use of the verb "comprise" and its conjugations does not exclude the presence of elements other than those specified in the claims. The use of the indefinite article "a" or "an" preceding an element does not exclude the presence of a plurality of such elements.

The invention claimed is:

1. A lighting system provided with a light-emitting panel comprising a front wall, a rear wall situated opposite thereto and an edge between the front wall and the rear wall, at least one light source comprising a light-emitting diode provided with a translucent lens-shaped cover, at least one light input structure for coupling light from the light source into the edge of the light-emitting panel, wherein, during operation, light originating from the light source is incident on the light input structure and distributes itself in the light-emitting panel, the light input structure is conically or frustoconically shaped towards the light source, and the thickness $d_p$ of the light-emitting panel is smaller than the diameter $d_c$ of the translucent lens-shaped cover of the light source.

2. A lighting system as claimed in claim 1, wherein the light input structure is of prismatic or pyramidal shape.

3. A lighting system as claimed in claim 1, wherein the light input structure is an integral part of the light-emitting panel.

4. A lighting system provided with a light-emitting panel comprising a front wall, a rear wall situated opposite thereto, at least one light source comprising a light-emitting diode provided with a translucent lens-shaped cover, at least one light input structure for coupling light from the light source into the light-emitting panel, wherein, during operation, light originating from the light source is incident on the light input structure and distributes itself in the light-emitting panel, the light input structure is conically or frustoconically shaped towards the light source, and the thickness $d_p$ of the light-emitting panel is smaller than the diameter $d_c$ of the translucent lens-shaped cover of the light source, wherein light-guidance means are provided in the vicinity of the light source and the light-emitting panel so as to encompass the light input structure, said light-guidance means guiding the light originating from the light source towards the light input structure.

5. A lighting system as claimed in claim 4, wherein a surface of the light-guidance means facing the light input structure is reflective or provided with a reflective material.

6. A lighting system as claimed in claim 4, wherein the light-guidance means are elliptically shaped.

7. A lighting system as claimed in claim 4, wherein the light-guidance means are faceted.

8. A lighting system as claimed in claim 1, wherein the light-emitting diode has a luminous flux of at least 10 lm.

9. A display device provided with a lighting system as claimed in claim 1.

10. A display device as claimed in claim 9, which display device comprises a liquid crystal display.

11. A display device provided with a lighting system provided with a light-emitting panel comprising a front wall, a rear wall situated opposite thereto, at least one light source comprising a light-emitting diode provided with a translucent lens-shaped cover, at least one light input structure for coupling light from the light source into the light-emitting panel, wherein, during operation, light originating from the light source is incident on the light input structure and distributes itself in the light-emitting panel, the light input structure is conically or frustoconically shaped towards the light source, and the thickness $d_p$ of the light-emitting panel is smaller than the diameter $d_c$ of the translucent lens-shaped cover of the light source, wherein the display device comprises a liquid crystal display.

* * * * *